May 30, 1967
J. G. FISHER
3,322,916
DOFF TRUCK BOXES AND THE LIKE AND
RUB GUARDS AND BUMPERS THEREFOR
Filed March 21, 1966
4 Sheets-Sheet 1
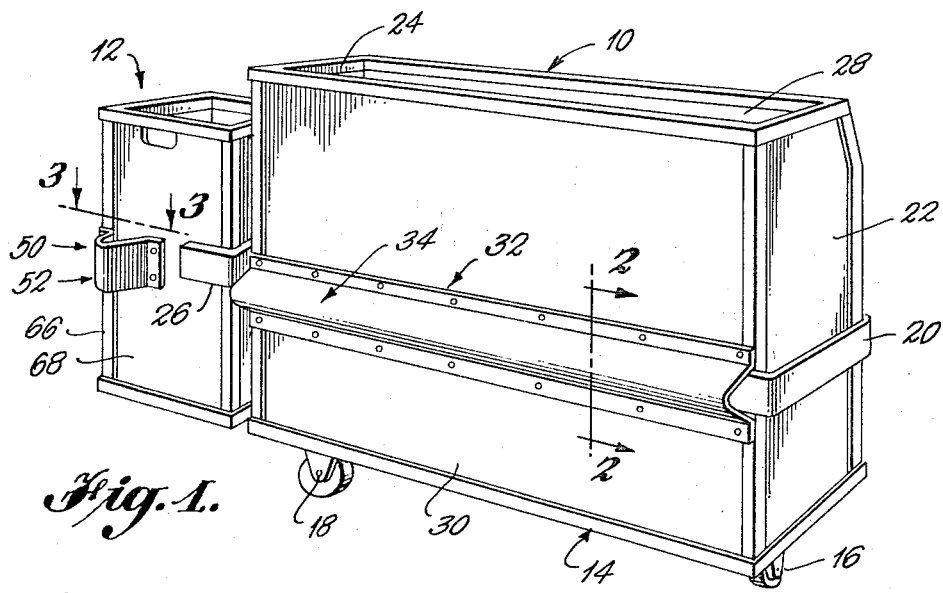
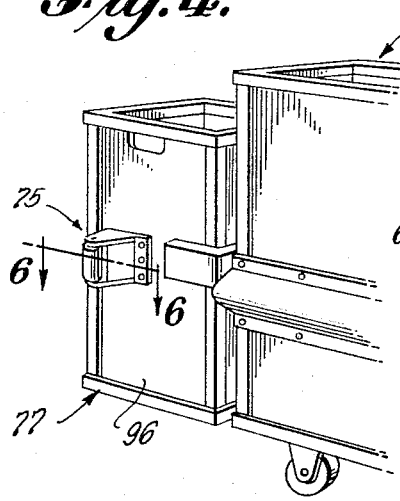
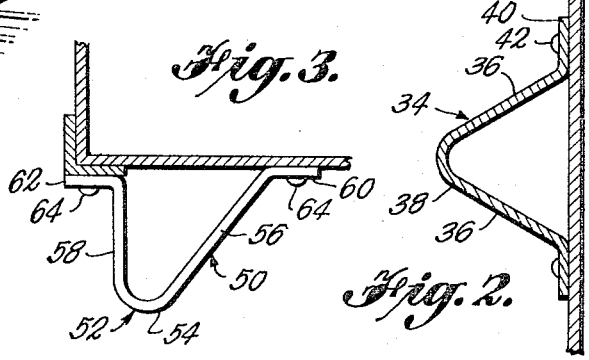
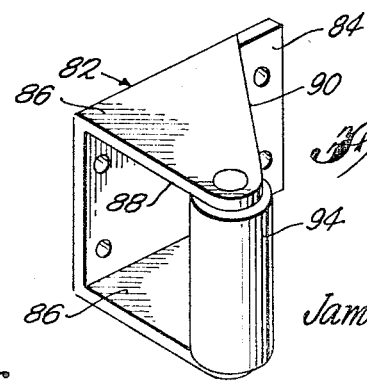
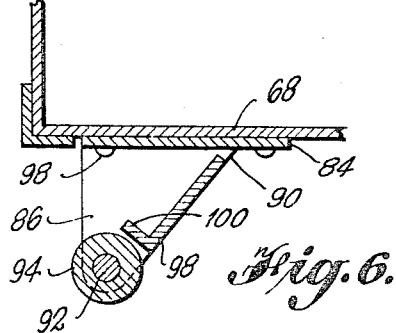
INVENTOR
James Glenn Fisher
BY Shoemaker and Mattare
ATTORNEYS May 30, 1967
J. G. FISHER
3,322,916
DOFF TRUCK BOXES AND THE LIKE AND
RUB GUARDS AND BUMPERS THEREFOR
Filed March 21, 1966
4 Sheets-Sheet 2
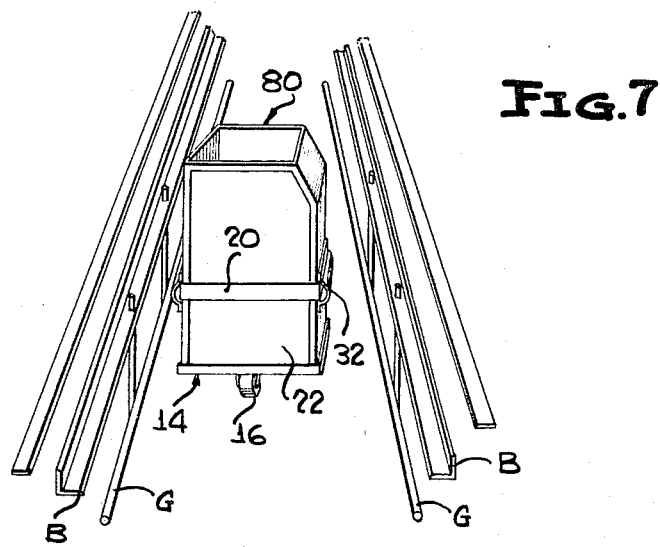
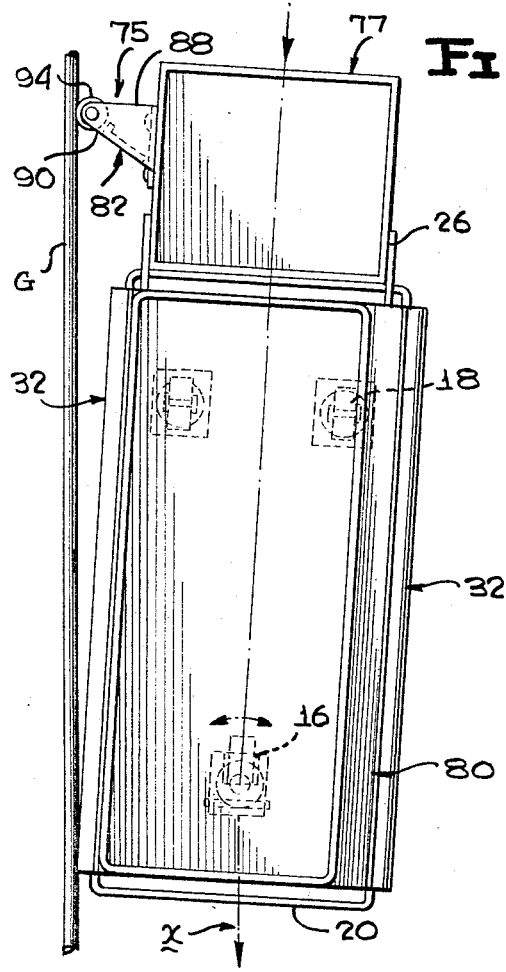
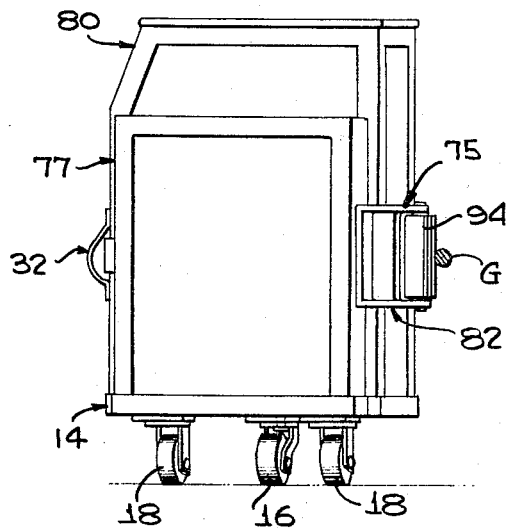
INVENTOR
JAMES GLENN FISHER
BY *Shoemaker and Mattare*
ATTORNEYS

INVENTOR
JAMES GLENN FISHER

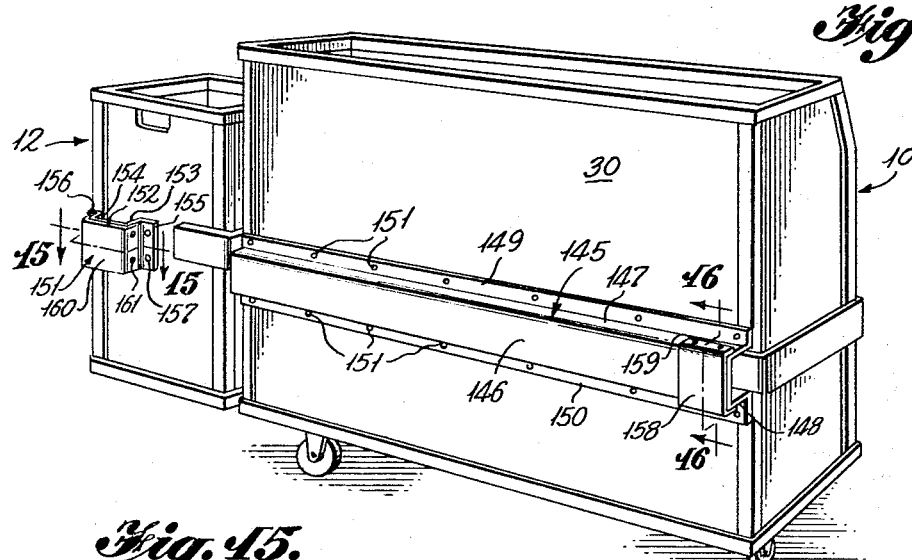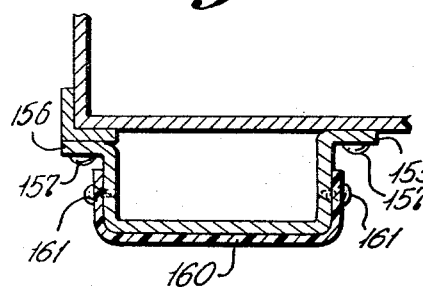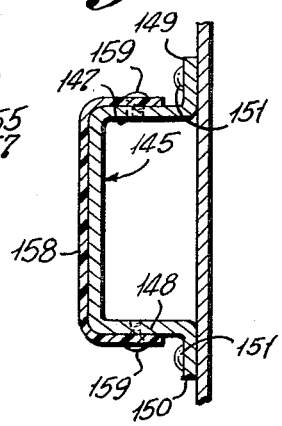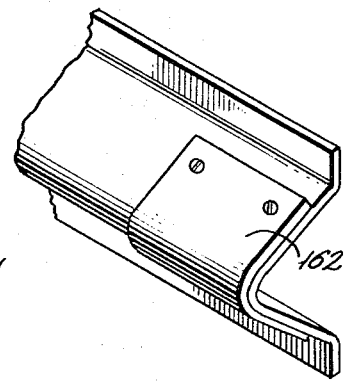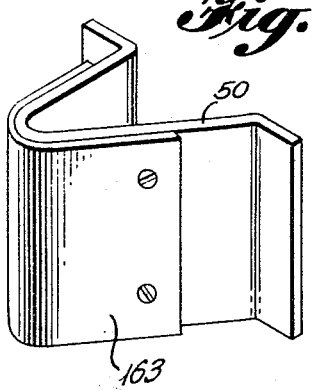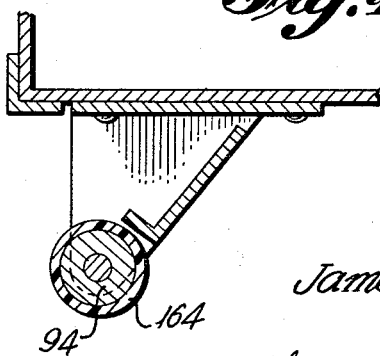

United States Patent Office 3,322,916
Patented May 30, 1967

3,322,916
DOFF TRUCK BOXES AND THE LIKE AND RUB GUARDS AND BUMPERS THEREFOR
James Glenn Fisher, Hartwell, Ga., assignor to NVF Company, Wilmington, Del.
Filed Mar. 21, 1966, Ser. No. 543,467
7 Claims. (Cl. 280—79.2)

This application is a continuation-in-part of my application Ser. No. 286,130, filed June 4, 1963, which in turn is a continuation-in-part of my prior application Ser. No. 100,903, filed Apr. 5, 1961, now abandoned.

This invention relates generally to equipment designed to be used in association with textile machines and the like and is directed particularly to improvements in doff truck boxes and other boxes used around the textile machines.

In the use of doff trucks between spinning frames, for example, difficulty is had by the worker moving the truck to keep the truck running straight between the machines and as a result, since the aisles between the machines are not very wide, the trucks frequently strike an adjacent frame and there is consequently danger of damage done by the truck to the frame. This is particularly true where the construction of the spinning frames is such that no guard is provided on the machine base rail.

It is a particular object of the present invention in the light of the foregoing, to provide a doff truck box or other truck supported or wheel supported boxes designed to be used in the aisles between textile machines, with an improved novel rub guard which will effectively fend off the box from the adjacent machine in the event that the truck or wheeled box swerves from the straight path between the machines. The spinning frames or spinning machines are equipped with base rails and thus by the use of a rubguard in the proper elevation on the doff box such guard may engage the base rail and thus prevent the box from coming close enough to the machine to strike and damage any projecting parts of the latter.

Another object of the present invention is to provide in association with a wheel or truck supported doff box and a smaller box mounted on one end of the doff box, for receiving bobbins, a rub guard on the doff box together with a bumper fender on the smaller or bobbin box, which bumper fender by being maintained in engagement with the base rail of the spinning frame will assist the operator of the truck in controlling the movement of the box and on the other hand, the bumper fender will additioinally functioin to prevent the bobbin box, mounted upon the rear end of the doff box, from running too close to the machine frame, particularly in case no guard may be present on the machine base rail and causing damage to some part of the machine.

A still further object of the invention is to provide a bumper fender for use on a bobbin box in the manner stated, which fender is designed so that it will ride smoothly along the machine base rail or a guard rail if such may be provided thereon.

The present invention constitutes an improvement upon the rub guard and bumper fender construction of my allowed application Ser. No. 789,665, filed Jan. 28, 1959, now Patent No. 2,980,437, and the present improved structure is directed to a rub guard secured longitudinally of a long side of the doff truck, which is transversely rounded and stands outwardly from the side of the doff truck a substantial distance for effective sliding contact either with a machine base rail or a guard thereon so as to maintain the box in the desired spaced relation with the machine.

In addition to its primary function the rub guard acts as a reinforcement along the side of the box to stiffen or rigidify the box wall.

In the use of a bobbin box in association with the doff box means is provided for mounting the smaller bobbin box on the doff box for the purpose of collecting or carrying empty bobbins and the smaller box is provided with a bumper fender disposed in substantially the same horizontal plane and centered at the same height from the floor as the rub guard on the doff box and the bumper fender is formed to present an outwardly directed or outwardly facing rounded surface which may be effectively maintained in position by the operator of the trucks against the base rail or base guard rail of the adjacent machine frame.

To further assist the operator in maintaining the doff box moving forwardly in a straight path ahead of the bobbin box the bumper fender projects outwardly a distance slightly greater than the rub guard of the doff box and accordingly the bumper fender provides a bearing surface to permit the bobbin box to be rocker slightly with respect to the machine base rail and by this means the forward or advancing end of the doff box can be easily kept moving straight along the guard.

As is disclosed in my prior application the doff box only is wheel supported, the bobbin box being attached to hang free on the rear end of the doff box and the wheel arrangement for supporting the doff box is such that the operator can easily control the movements of the doff box by bearing down slightly on the doff box so as to lighten the pressure of the wheel at the forward end of the doff box, on the floor. Thus, by the combined action of pressing the rounded surface of the bumper fender against the machine base rail or the machine guard rail and bearing down slightly upon the bobbin box, the forward end of the doff box can be easily swung as necessary transversely of the aisle so as to facilitate the smooth advancement of the boxes.

A further object of the invention is to provide the combination of a doff truck box or package box and a bobbin box mounted on the rear end thereof, wherein the package or doff box is provided with a rub guard extending longitudinally of each side thereof, with one of the rub guards having the forward end thereof reinforced by a heavy duty plate secured across the forward end of the box and having one end turned back against and secured to the outer face of the said one rub guard, to provide a heavy wear surface for engagement with a machine guard rail, against which the forward end of the package box is turned or directed as the combination package box and bobbin box are moved forwardly along an aisle between two machines and wherein the bobbin box is provided with the laterally projecting bumper fender for engagement with the machine guard rail and thereby maintain the two joined or connected receptacles in the desired relationship with respect to the adjacent machine guard rail.

Another object is to provide the rub guard and the bumper fender with a coating or covering of a resinous abrasive resistant material having self-lubricating properties to withstand the wear imposed by striking the rub guard and bumper fender against the machine guard rail and by causing one or both to move along the machine guard rail.

The invention will be best understood from a consideration of the following detailed description taken in connection with the accompanying drawings forming a part of this specification with the understanding, however, that the invention is not confined to a trict conformity with the showing of the drawings, but may be changed or modified so long as such changes or modifications mark no material departure from the salient features of the invention as defined by the appended claims.

In the drawings:

FIG. 1 is a view in perspective of a wheel supported doff box or doff truck having the smaller bobbin box mounted upon the rear end thereof, and showing the rub guard and bumper fender respectively for the two boxes, this view illustrating the embodiment of the bumper fender where the latter comprises a one piece unit having a transversely rounded outer rub face or surface.

FIG. 2 is a sectional view taken substantially on the line 2—2 of FIG. 1.

FIG. 3 is a sectional view taken substantially on the line 3—3 of FIG. 1.

FIG. 4 is a perspective view of the rear portion of the doff truck box showing the bobbin box mounted thereon and illustrating another form or embodiment of the bumper fender.

FIG. 5 is a perspective view of the bumper fender per se.

FIG. 6 is a sectional view taken substantially on the line 6—6 of FIG. 4.

FIG. 7 is a view in perspective illustrating, more-or-less diagrammatically, an aisle way between the frames of a pair of machines such, for example, as the frames of spinning machines, and illustrating the position in the aisle between the frames of the coupled truck and empty bobbin container equipped respectively with the guide rail and bumper fender which cooperate, in the manner to be described, in facilitating the maintenance of the truck and container or bobbin box moving in a straight path.

FIG. 8 is a view in top plan of the truck and bobbin container showing the operating positions of the rub guard and bumper fender with respect to or against the guide rail.

FIG. 9 is a rear end elevational view of the two bodies.

Figure 10:
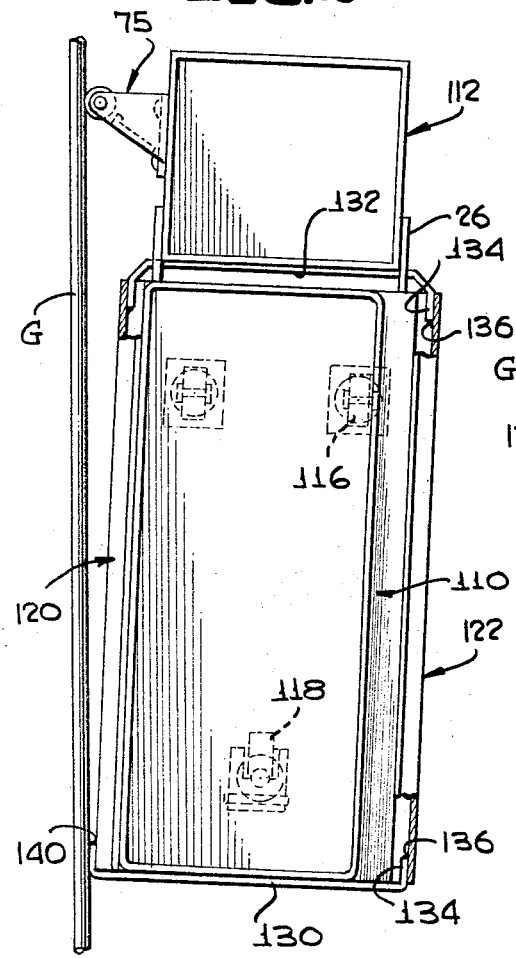

FIG. 10 is a view in top plan of the combined package of doff box and bobbin box disposed adjacent to a guard rail of a machine and illustrating the reinforcing construction for the forward end of a rub guard having a flat outwardly directed side.

Figure 11:
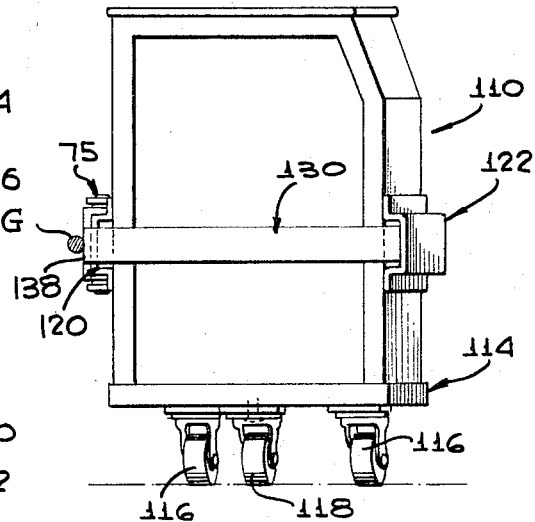

FIG. 11 is a perspective view looking toward the forward end of the package box and longitudinally thereof.

Figure 12:
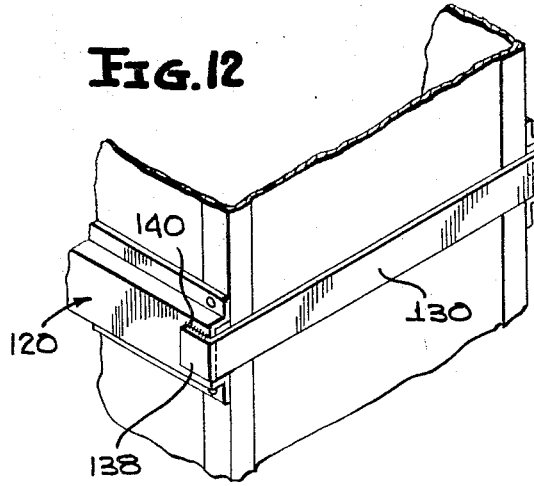

FIG. 12 is a fragmentary detail on an enlarged scale of the forward end of the inner or left hand rub guard, illustrating the association of the transverse front reinforcement plate with the forward ends of the two rub guards and showing the rearwardly turned end of the reinforcement plate extending into the rub guard on the outer side or right hand side of the box.

Figure 13:
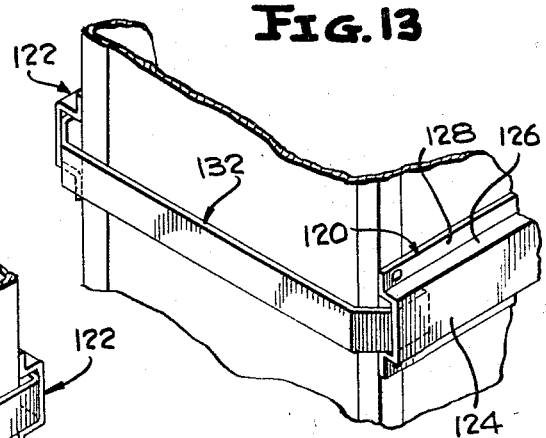

FIG. 13 is a perspective view of the rear end of the package or doff box, with the bobbin box removed and illustrating the reinforcing plate standing away from the rear end of the package box to provide a hanger bar to which the bobbin box is attached.

FIG. 14 is a side elevational view of the package or doff box with the bobbin box attached and showing the resinous abrasive resistant material on the rub guard and bumper fender.

FIG. 15 is a cross-section taken on line 15—15.

FIG. 16 is a cross-section taken on line 16—16.

FIG. 17 is a modification of one end of the rub guard as shown in FIG. 1.

FIG. 18 is a modification of the bumper guard as shown in FIG. 1.

FIG. 19 is a modification of the bumper guard as shown in FIG. 4.

Referring now more particularly to the drawing, the numeral 10 generally designates in FIG. 1, the doff truck box while the numeral 12 generally designates the smaller bobbin box.

In the illustration of the doff box the latter is shown as an integral part of a wheel supported base 14, the numeral 16 designating a center positioned swivel caster wheel and the numeral 18 designating one of two transversely positioned rear caster wheels. While only one of the rear caster wheels is shown in FIG. 1, it is to be understood that the arrangement of these wheels in association with the forward centrally located wheel 16 is substantially the same as illustrated in my prior application hereinbefore referred to.

While the box 10 has been shown as stated as forming an integral part of the base 14, it is to be understood that the invention is not limited to this specific construction, since the base and box may form individual or separate units with the box removably mounted upon the base.

The numeral 20 designates a mounting bar secured across an end wall 22 of the box 10 and a similar bar in FIG. 1, is mounted across the opposite end wall 24 as shown in my prior application. These mounting bars provide a means for securing or mounting the smaller bobbin box 12 upon a selected end of the doff box and to facilitate this, the bar 20 illustrated and also the one on the opposite end, not illustrated, is spaced slightly away from the adjacent end wall so that suitable coupling means may be connected between the same and suitable mounting bars 26 secured to the bobbin box 12 to extend forwardly.

No details are here given of the means for coupling the mounting bars 20 and 26 of the boxes since such means is fully illustrated in my prior application.

The numerals 28 and 30 designate the longitudinal side walls of the doff box or receptacle 10 and each of these side walls has secured longitudinally therealong a rub guard such as here illustrated and generally designated 32.

One only of the rub guards is shown in FIG. 1, since it will be understood that the one on the opposite wall 28 of the doff box is of exactly the same construction and extends the full length of the box and accordingly a description of the illustrated rub guard 32 will apply to the one forming part of the opposite wall of the box.

The rub guard 32 is preferably shaped from a single long piece of metal of suitable gauge and comprises a central rib 34 of substantially V formation as shown in FIG. 2. This rib includes the relatively wide legs 36 joined by a widely rounded portion 38. The leg portions 36 are formed integral with the oppositely extending flanges 40 which lie in a common plane as shown and are adapted to be positioned against the supporting side wall of the box to be secured firmly thereto by rivets, bolts or the like, as shown at 42. Thus, when the rub guard is mounted in operative position at the proper elevation on the side of the doff box it will be seen that the rib 34 projects outwardly to present the transversely rounded longitudinally extending nose portion 38 and when the rub guard is placed at the proper elevation with respect to the machines in association with which the doff truck is used, this rounded nose portion 38 may engage the machine base rail B or guard rail G, see FIG. 7, to keep the doff box and bobbin box away from the machine as hereinbefore explained.

The bobbin box or receptacle 12 carries the bumper fender which is generally designated 50. This fender in the form illustrated in FIGS. 1 and 3 is also formed from a single piece of metal of suitable gauge which is bent to provide a vertically disposed rib 52 having a rounded nose portion 54 and the spaced leg portions 56 and 58 which are in divergent relation and which join and terminate in the flanges 60 and 62. These flanges 60 and 62 are secured by rivets, bolts or the like 64 to the side wall of the bobbin box, one of the flanges, here shown as the flange 62, being mounted upon the reinforcing corner bar 66 of the bobbin box while the other flange 60 may be secured directly to the adjacent side wall 68. The length of the legs 56 and 58 of the bumper fender is such as to position the outer rounded surfaces 54 slightly beyond the rounded surface of the nose portion 38 of the rub guard carried by the doff box.

Also, as will be readily seen, the elevation of the bumper fender is the same as that of the rub guard so that the bumper fender can be maintained with its rounded surface 54 in sliding engagement with the adjacent machine guard rail and since it projects slightly beyond the nose of the rub guard it will be seen that even if the doff box is maintained in a straight ahead line in the aisle or parallel with the adjacent machine, the rub guard will be free of contact with the adjacent machine base rail.

In FIG. 4 there is illustrated another embodiment of the bumper fender which is generally designated 75.

The bobbin box on which the bumper fender 75 is mounted is generally designated 77 and is shown in association with a doff truck receptacle, only a portion of which is shown in FIG. 4, and which is generally designated 80.

The bumper fender 75 is in the form of a bracket 82, consisting of a mounting plate 84 having top and bottom edges from which project the spaced parallel ears 86, the edges 88 and 90 of each of which ears extend outwardly in convergent relation and receive between them a pivot pin 92. This pivot pin passes through a roller 94.

The plate 84 is mounted on the side of the bobbin box at the same elevation as the bumper fender 50 and the plate 84 is secured to the side wall 96 of the bobbin box by rivets, bolts or the like 98 so that the roller extends outwardly from the side wall of the bobbin box and is disposed vertically to present a rounded contacting surface for engagement with the machine base rail or guard rail in the same manner as the outwardly presented rounded nose 54 of the fender 50.

It will also be understood that the outward projection of the ears 86 is such as to position the rounded surface of the roller slightly beyond the surface of the nose 38 of the adjacent rub guard.

In the bumper fender 50 the leg portions 56 and 58 are shown disposed with the rearward leg 58 substantially perpendicular to the side wall 68 of the bobbin box while the leg 56 forms an obtuse angle with the wall, extending forwardly.

As is clearly shown in FIGS. 5 and 6, the ears 86 of the bumper fender 75 are formed each with one edge perpendicular to the plate 84 as indicated at 88, while the other edge is inclined with respect to the face of the plate or slopes forwardly forming an obtuse angle with the plate. The ears 86 at the forward edges 90 thereof have fixed vertically between them a wall plate 98 and the outer edge of this plate is bordered by an inturned flange 100 which is in close proximity to the roller 94. This plate 98 serves to strengthen the bracket. Additionally, in the operation of the bobbin box the roller 94 engages a projecting portion of the machine as hereinafter described and in rolling the doff truck up to the machine it sometimes happens that this projection hits on the plate 98 and this plate then functions to guide the rail or projecting portion of the machine onto the roller 94. The flange 100 serves to resist bending of the plate. Without the flange the plate might become bent from striking the machine rail and thus the function of the plate to guide the rail onto the roller would be defeated.

While the illustrated construction is preferred, it is to be understood that the two legs may both be divergently related so that they form corresponding angles with the adjacent bobbin box wall in a manner similar to the disposition of the legs 36 of the rub guard.

In connection with the bumper fender 75, it is also to be pointed out that while the edges 88 and 90 of the ears are disposed in the manner described, that is one perpendicular to the plate 84 and the other forming an obtuse angle therewith, the ears may be formed so that these edges form corresponding or like angles with the base plate if desired.

While in FIGS. 1 and 4 only one side of the doff box has been shown with the rub guard thereon, it is to be understood that a similar rub guard may be mounted in the same manner upon the opposite wall of the box for fending off the box from either of two machines between which the box is being moved. However, in the manipulation of the equipment between the machines it will be seen that only the one bumper fender need be used as this can be maintained at all times against the guard rail of one machine to facilitate guiding the equiment in the manner described.

It will also be apparent that both of the bumper fenders 50 and 75 present at all times a round bearing surface for contact with the guard rail of an adjacent machine. The nose or rounded surface 54 of the bumper fender 50 will merely rub against the machine guard rail, while the roller 94 will rotate as will be readily obvious.

From the foregoing it will be apparent that there is provided in the present invention of the bumper fender and the rub guard, and particularly in the two embodiments of the bumper fender, new and novel means whereby the operation of a package box or a doff truck together with a bobbin box between spaced machines can be greatly facilitated whereby all possibility of damaging machines by any parts of the boxes will be completely avoided.

FIGS. 7 to 9 inclusive illustrate the cooperative relationship of the bumper fender carred by the bobbin box and the rub guard carried by the truck box, in use, to assist in keeping the boxes moving in a straight path in the aisle between the adjacent machines, or, in other words, between adjacent base rails or adjacent guard rails lying on opposite sides of the aisle.

In the showing of FIGS. 7 and 9, the truck box is illustrated with the bobbin box of FIG. 4, wherein the bumper fender embodies the roller 94. However, the truck box of these FIGURES 7 to 9 is of the same construction as the box 10 and the box designated 80 in FIG. 4, and while different reference numerals have been employed for designating the boxes in FIGS. 1 and 4, it will be seen that the details of construction are the same and accordingly the same reference numerals are employed in FIGS. 7 to 9 to designate the specific elements or parts of the box.

As shown particularly in FIG. 8, the bumper fender carried by the bobbin box and the rub guard carried by the truck box will normally be maintained in contact with either the base rail or the guard rail, depending upon the height of the parts carried by the boxes from the floor. Preferably, the bumper fender and the rub guard are positioned at the proper height from the floor to engage the guard rail G of the spinning frame.

The bumper fender on the bobbin box is centered at the same height from the floor as the rub guard on the truck box.

In the operation of a truck box and bobbin box between adjacent machine frames, where rub guards may be carried by the boxes, which project the same distance laterally to engage a guard rail or base rail, it is difficult to keep the boxes from swinging back and forth between the opposite rails of the adjacent machines.

By the use of bumper fenders and rub guards such as are herein shown and described, where the bumper fender extends outwardly a substantial distance from the longitudinal center of the boxes and beyond the rub guard, the bumper fender will tend always to swing the forward or advancing end of the truck box and the forward end of the inner rub guard, inwardly toward the adjacent guard rail and thus while the longitudinal centers of the coupled boxes are at an angle to the guard rail, the paths of travel will be parallel to the guard rail as indicated by the arrow x in FIG. 8.

Stated another way, the action obtained by the use of the bumper fender and rub guard together upon the boxes is substantially as follows. The rigid wheel or non-rotatable caster 18 on the rear outer side of the truck acts as, or provides, a pivot point and the bumper fender, the roller bearing 94 as shown in FIG. 8, or the rounded nose 54 of the fender 50, extending farther outwardly than the longitudinal centers of the two trucks than the rub guard, constantly tries to turn the front or advancing end of the truck in toward the guard rail with which the bumper fender is in contact, thus making the forward end of the rub guard hug the guard rail.

Accordingly it will be seen that the bumper fender on the bobbin box and the rub guard on the truck box function cooperatively to keep the boxes moving along in a straight path so that the operator does not have to be constantly struggling to keep the boxes from swinging back and forth across the aisle.

FIGS. 10 to 13 illustrate another structural arrangement and form of the rub guards and these figures also illustrated modifications of the hereinbefore described mounting bars extending across the ends of the doff or package box.

In these FIGURES 10 to 13 the wheel supported, or truck supported package box is generally designated 110 while the bobbin box, mounted upon the rear end of the package box, is generally designated 112.

As in the previously described structures, the package box is supported by three casters or wheels which may be attached directly to the bottom of the box or they may be attached to a frame or base 114 upon which the box is positioned. Two of the rollers or casters are of the non-swivelling type and are disposed adjacent to the rear end of the box in transversely spaced relation with one another and are designated 116. The third wheel is of the swivel caster type and is generally designated 118 and is located at the forward end of the box on the longitudinal center thereof as shown.

Since the bobbin box shown in FIG. 10 is of the same construction as that shown in FIG. 8, the same reference characters will be employed to designate the mounting bars and the bumper fender. The mounting bars are designated 26 and are employed in the manner hereinafter described to attach the bobbin box to the rear end of the package box and the bumper fender is generally designated 75 and is of the same design or construction as is illustrated in FIGS. 4 to 6 and FIG. 8.

The reference character G designates the guard rail which extends along the front of the machine adjacent to which the doff box or package box and bobbin box are moved.

The package box 110 has secured longitudinally of each side, a rub guard which, upon the inner side of the box, is designated 120, and upon the outer side of the box the rub guard is designated 122.

As shown the rub guard 120, referred to as being upon the inner side, is on the same side of the box as the bumper fender 75. Accordingly, the forward or advancing end of this inner rub guard will be subjected to strains and to excessive wear, if not protected and reinforced, which the opposite or rear end would not be subjected to and which the outer rub guard would not have to sustain.

Reinforcement of the forward end of the inner rub guard is provided in the manner hereinafter set forth, together with protection against excessive wear, and the rear end of the inner guard and both ends of the outer guard are also reinforced in the manner hereinafter set forth.

As illustrated, each of the rub guards is formed or constructed in exactly the same manner. Accordingly the same reference characters will be used to define and indicate the parts of the rub guards.

Each rub guard is formed of a suitable length of heavy gauge metal, preferably steel, of substantial initial width. The steel piece or strip is shaped into a channel form whereby there is provided the relatively wide flat middle section 124, bordered by the inturned relatively narrow or low leg portions 126 and each of the leg portions in turn, is integral with an outwardly projecting or outturned mounting flange 128.

The rub guards are secured to the sides of the box 110 in a suitable manner, either by rivetting or by being welded, depending upon the type of material forming the shell or box. The flanges 128 receive the rivets or are welded to the box so that the channel portion of the guard is directed toward the box and the wide middle section of the rub guard is directed or faced laterally and is disposed in a vertical plane as is clearly shown and this middle section is of substantial width as shown, so that it can engage a guard rail of a machine or the different guard rails of the machines, even through they may vary slightly in the elevation of the same above the floor upon which the box is resting.

Extending transversely of the forward end of the box 110 is a relatively wide flat reinforcing plate 130 and a similar plate 132 is disposed transversely of the rear end of the box.

The forward plate 130 is secured directly against the front wall of the box and the outer or right hand end thereof has a right angular extension 134 which is inserted into the forward end of the channel of the adjacent rub guard 122 and welded thereto as indicated at 136.

The inner or left hand end of the bar 130 is also formed with the right angle extension 136, but as shown in FIGS. 10 and 12, this extension is positioned against the outer face of the middle section of the rub guard 120, to which it is welded as indicated at 140. Thus the inner or guard rail end of the bar or plate 130 extends across the channel of the rub guard 120, at the forward end of the latter, and reinforces this end of the rub guard. In other words the extension 138 of the reinforcing plate provides a striker and wear plate. This plate or extension 138 which forms the striker plate will be subjected to constant, or substantially constant with a machine guard rail in the manner illustrated in FIG. 10, and thus takes the wear which would otherwise be imposed upon the forward end of the rub guard 120.

While any suitable weight of material may be employed for the rub guards and the reinforcing plates, it has been found that 18 gauge metal is entirely satisfactory for this use.

At the rear end of the package box 110 the reinforcing bar 132 has portions of each end bent to form the legs 134 and these legs are extended into the rear ends of the channels of the rub guards 120 and 122 as illustrated in FIGS. 10 and 13 and are welded thereto as indicated at 136. The legs 134 are formed, however, so as to permit the bar 132 to stand away slightly from the rear wall of the package box so that the hanger members 26 carried by the bobbin box 112 may be engaged with the bar 132. Thus the bar 132 forms the double function of a reinforcement and a suspension means for the bobbin box.

It will be seen from the foregoing that the structure illustrated in FIGS. 10 and 13 will function in the same manner as hereinbefore described, to keep the boxes moving in a straight path and in addition, the novel arrangement of the inner or guard rail end 138 of the reinforcing bar 130, which is constantly subjected to rubbing and bumping, will, because of the manner in which it is joined to the forward end of the inner rub guard, add materially to the life of the equipment.

FIGS. 14 to 16 show another form of the invention wherein the rub guard 145 of the doff box 10 is of substantially rectangular formation having a surface portion 146 which engages the machine guard rail G. The rub guard 145 has inwardly directed sides 147 and 148 arranged at substantially right angles to the surface portion 146. Each of the sides 147 and 148 have outwardly extending legs 149 and 150 at substantially right angles thereto. Fastener means, such as rivets 151, extend through the legs 149 and 150 and the side wall 30 of the doff box to attach the rub guard thereto.

Mounted or attached to one end of the doff box 10 is an empty bobbin box 12 for holding the empty bobbins as they are removed from the spinning or other textile machine. The bobbin box 12 is provided with a bumper fender 151 which is of the same configuration as the rub guard 145 and is provided with a surface portion 152 and sides 153 and 154 with outwardly extending legs 155 and 156 mounted or fastened to the side of the bobbin box with fastening means such as rivets 157. The bumper fender 151 is mounted on the bobbin box 12 in the same longitudinal plane as the rub guard 145 but extends outwardly from the bobbin box beyond the rub guard 145 so that the surface portion 152 of the bumper fender is outwardly of the surface portion 146 of the rub guard. The bumper fender is mounted on the bobbin box with the legs 155 and 156 at substantially right angles to the legs 149 and 150 of the rub guard 145.

The rub guard 145 has mounted thereon or attached thereto, adjacent the end remote from the bobbin box, a resinous abrasive resistant material 158 having self-lubricating properties. It has been found that if the rub guard and the guard rail G are of metal, either similar or dissimilar, that excessive wear is produced on the metals. By mounting thereon or attaching thereto at the point of contact a covering of a resinous abrasive resistance material having self-lubricating properties this excessive wear is practically eliminated. The resinous material used has been polyethylene, tetrafluoroethylene, vinyl or nylon. The resinous material may be mounted on the rub guard by direct adhesion thereto or by means of a fastening means such as screws or rivets 159.

The bumper fender 151 also has mounted thereon or attached thereto a resinous abrasive resistant material 160 by means of a fastening means such as screws or rivets 161. This material is of the same material as used on the rub guard and therefore has the same properties and is for the same purpose.

FIG. 17 is a modification of one end of the rub guard of FIG. 1 wherein a resinous abrasive resistant material 162 may be mounted thereon or attached thereto. The material used is the same as described previously and may be mounted or attached in the same manner.

FIG. 18 is a modification of the bumper fender 50 of FIG. 1 wherein a resinous abrasive resistant material 163 may be mounted thereon or attached thereto.

FIG. 19 is a modification of the roller 94 as shown in FIGS. 4, 5 and 6 wherein a resinous abrasive resistant material 164 may be mounted thereon or attached thereto. The material used in FIGS. 18 and 19 may be the same as previously described and may be mounted or attached in the same manner.

As this invention may be embodied in several forms without departing from the spirit or essential characteristics thereof, the present embodiment is therefore illustrative and not restrictive, since the scope of the invention is defined in the appended claims, and all changes that fall within the metes and bounds of the claims, or that form their functional as well as conjointly cooperative equivalents, are therefore intended to be embraced by those claims.

I claim:

1. Equipment for use in association with textile machinery having a horizontal rail, said equipment comprising an elongate truck supported package box having a front end and a rear end, a pair of fixed supporting rollers adjacent to and spaced apart transversely of one end of said box, a single swivelling caster roller beneath and supporting the other end of said box, an elongate triangular shaped rub guard secured to and extending longitudinally of a side of said package box and having a transversely rounded apex portion extending laterally outwardly from the said side of the package box for engaging the said machinery rail, a bobbin box attached to and supported by said one end of said package box, a bumper fender secured on a side of said bobbin box corresponding to said side of said package box and at a corresponding elevation to said rub guard, said bumper fender having a substantially triangular structural form and including a base means secured against the said one side of the bobbin box, the apical portion of the triangle extending laterally outwardly from said side of the bobbin box, the said bumper fender having a vertical dimension and having in the apical portion thereof a transversely rounded laterally outwardly directed surface located at a greater distance laterally outwardly from the said side of the bobbin box than the said machine rail engaging rounded apex surface of the rub guard and providing a vertical line contact surface with the machinery rail.

2. The invention according to claim 1, wherein said rub guard consists of a length of relatively wide material bent between its longitudinal side edges with portions thereof along said side edges extending oppositely to one another and forming mounting base means, and wherein said bumper fender consists of a plate member bent longitudinally of and between opposite side edges with portions along said side edges extending oppositely to one another and forming the said base means secured against said one side of the bobbin box, and the said transversely rounded outwardly directed surface being formed by the bend in the plate.

3. The invention according to claim 1, wherein said rub guard consists of a length of relatively wide material bent between its longitudinal side edges with portions along said side edges extending oppositely one another and forming mounting base means, and wherein the said bumper fender consists of a plate forming said base means therefor secured against said one side of the bobbin box and two spaced substantially parallel outwardly projecting substantially triangular outwardly tapering ears and a roller member rotatably mounted between the apex portions of said triangular ears and the said transversely rounded laterally outwardly directed surface being provided by the surface of said roller.

4. The structure as set forth in claim 1, wherein at least one of the engaging portions of the rub guard and bumper fender is provided with an abrasive resistant material on a part thereof.

5. The structure as set forth in claim 1, wherein the apical portion of the bumper fender is provided with an abrasive resistant material.

6. The structure as set forth in claim 1, wherein the apex portion of the rub guard is provided with an abrasive resistant material.

7. The structure as set forth in claim 3, wherein the roller is provided with a covering of abrasive resistant material.

References Cited

UNITED STATES PATENTS

| | | | |
|---|---|---|---|
| 2,177,112 | 10/1939 | Johnstone. | |
| 2,264,228 | 11/1941 | Wagner | 293—62 X |
| 2,720,119 | 10/1955 | Sherman. | |
| 2,980,437 | 4/1961 | Fisher | 280—79.2 |
| 2,985,479 | 5/1961 | Ortega et al. | 293—72 X |
| 2,999,764 | 9/1961 | Rhoads. | |
| 3,059,318 | 10/1962 | Herbert et al. | |
| 3,067,137 | 12/1962 | Strub. | |
| 3,123,909 | 3/1964 | Dorst | 293—62 X |

BENJAMIN HERSH, *Primary Examiner.*

C. C. PARSONS, *Assistant Examiner.*